Sept. 14, 1926.
R. E. MITTON
1,599,619
AIR VALVE
Filed Dec. 8, 1925
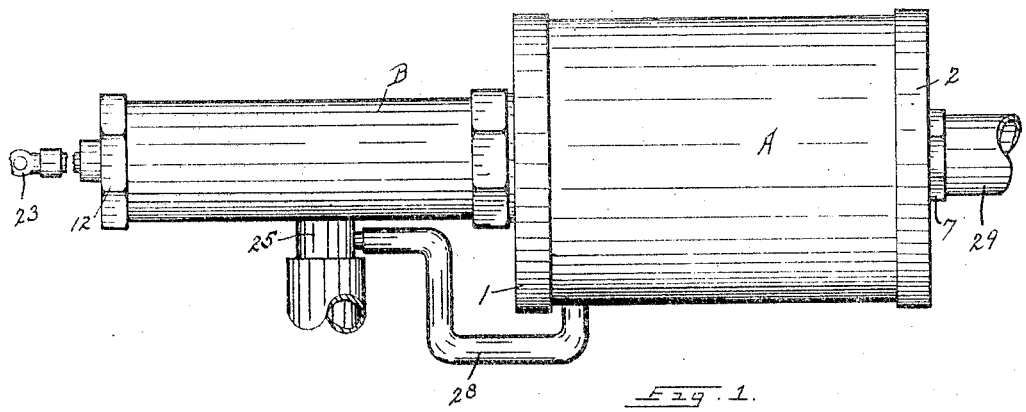
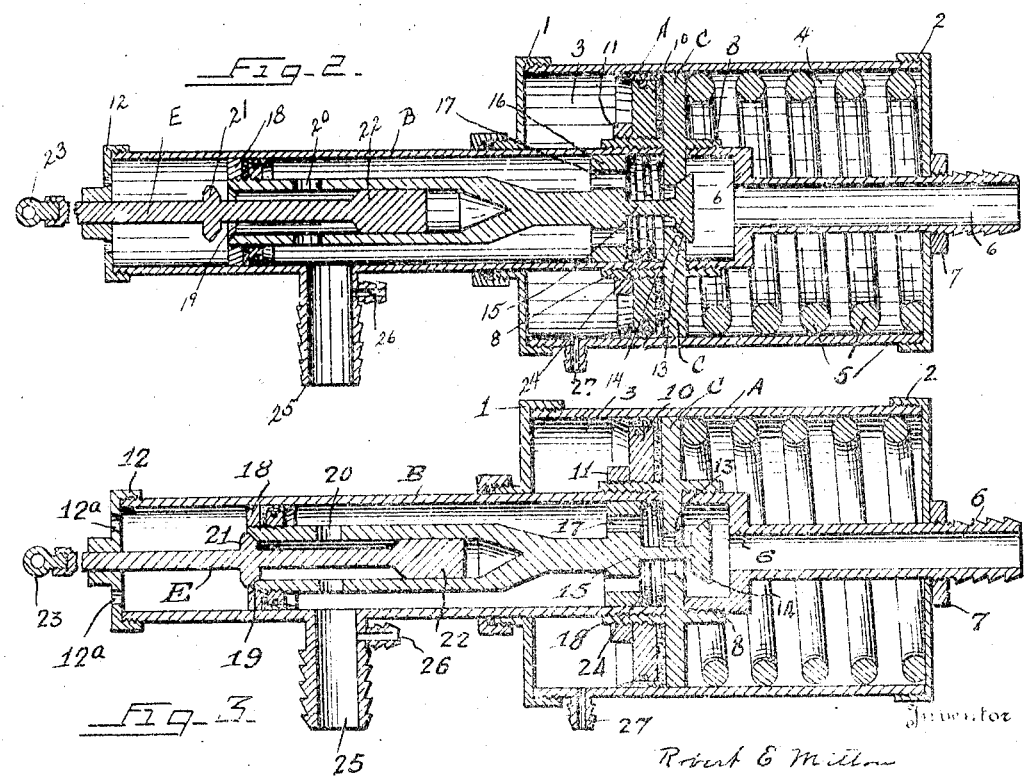
Inventor
Robert E. Mitton Patented Sept. 14, 1926.

1,599,619

UNITED STATES PATENT OFFICE.

ROBERT E. MITTON, OF SALT LAKE CITY, UTAH, ASSIGNOR TO PNEUMATIC FOUR-WHEEL BRAKE COMPANY, OF SALT LAKE CITY, UTAH, A CORPORATION OF UTAH.

AIR VALVE.

Application filed December 8, 1925. Serial No. 74,204.

REISSUED

My invention relates to valves and has for its object to provide a new and efficient automatic valve for controlling air.

A further object is to provide a valve whereby the pressure of compressed air through air lines, in either direction, may be automatically maintained, released or applied to control mechanical movements and to overcome momentum, and particularly to provide a quick acting automatic control valve for air brake mechanism on automobiles and other conveyances. Also to control the distribution of power to such conveyances.

These objects I accomplish with the device illustrated in the accompanying drawings in which similar letters and numerals of reference indicate like parts throughout the several views and as described in the specification forming a part of this application and pointed out in the appended claims, it being understood that slight changes and modifications may be made in construction without departing from the spirit of the invention as set out in the claims.

In the drawings in which I have shown the best and most substantial embodiment of my invention, Figure 1 is an elevation of my valve with parts cut away. Figure 2 is a longitudinal diametrical section of the valve. Figure 3 is the same section as shown in Figure 2 with the valve 21 closed and the valve 14 open.

In the drawings I have shown the major portion of my valve enclosed in a cylindrical casing A, which has closure caps 1 and 2 screwed on the ends thereof. A hollow piston rod B is slidably carried in the casing A, which rod and its connections form the other portion of my valve. On one end of said piston rod B a closure cap 12 is screwed having ports 12ª bored therethrough to allow passage of air, when air escapement is required in the operation of the valve. The other end of the piston rod B is fastened centrally in a piston C which is operatively carried in the casing A and divides the interior of said casing A into two compartments 3 and 4. A main spiral spring 5 is carried in compartment 4, with one end of the spring bearing against the piston C and the other end against the closure cap 2. An inner casing 6 is concentrically secured to one face of the piston C with the free end portion passed axially through the closure cap 2. A jam nut 7 is screwed on the casing 6 to limit the movement of the piston C and casing 6 in one direction while allowing them to move in the opposite direction, and one end of a flexible air tube 29 is secured on the free end of the casing 6. A cylindrical or sleeve nut 8 is integrally formed on and concentric with said piston C within which flange or sleeve nut 8 the end portion of said casing is screwed, and in the opposite portion of said flange or sleeve nut 8 is screwed the end of the piston rod B. The end of the sleeve nut 8 in which the piston rod B is screwed is externally threaded to receive the packing washer 10 and the jam nut 11 which holds the washer and packing in place on the piston assembly C. The said piston C is centrally bored and cut to form a valve seat 13 in which the valve 14 normally seats. The valve 14 has a valve stem 15 secured centrally thereto and said stem is enlarged at 16 to form a guide which is longitudinally slidable in the said piston rod B. Holes 17 are provided in the enlarged guide 16 to allow passage of air therethrough. The other end portion of said valve stem 15 is externally threaded to receive the suitably packed piston head 18 which is the same size as the guide 16 and is also longitudinally slidable in the said piston rod B and which piston head 18 guides the valve stem 15 longitudinally within the said piston rod B. The said valve stem 15 is centrally bored for a portion of its length to receive the valve stem E with the edge of the bore chamfered to form a valve seat 19. Ports 20 are bored in the wall of the internally bored portion of the said valve stem 15 to allow passage of air therethrough. A valve 21 is formed on the valve stem E and when the stem is operated the valve 21 engages in the valve seat 19. One end portion of the said valve stem E is enlarged to form a guide 22, which is longitudinally slidable in the internally bored portion of the valve stem 15 and which acts as a support for the one end of the valve stem E. The other end of the said valve stem E is slidably carried in the closure cap 12 of the piston rod B, and the extreme end of said valve stem E is enlarged and internally threaded to receive an eye bolt 23. The said eye bolt 23 is provided so that a lever may be connected therewith for operating the valves 21 and 14. A spiral spring 24 is carried within the said piston rod B between the guide 16 and the piston C to normally hold the valve 14 in its seat 13. An air connection 25 is provided on one side of the said piston rod B to which an air line may be attached to carry the air to the desired places of use. A branch air connection 26 is provided on the side of 25 and a similar connection 27 is provided in the side of the chamber 3 of the casing A to which connections a flexible air tube 28 is attached to carry back-pressure of air to the chamber 3 from the air connection 25.

In the operation of my valve, pressure is applied at the eye bolt 23 in order to move the stem E longitudinally. This operation results in the closing of the exhaust valve 21 and the opening of the intake valve 14, which allows air to enter at the intake valve 14 and flow past or around the same, through the ports 17 in the guide 16 and into the tubular piston rod B, and against the piston head 18, through the ports 20 of the valve stem 15 and against the closure side of the exhaust valve 21, out through the passage 25 to the mechanism to be operated, and also by way of the flexible connection 28 into the automatic chamber 3. This produces a downward pressure on the piston C, with its valve seat 13, and shuts off the air flow when sufficient pressure is induced to compress the main spring 5 far enough to allow the valve 14 to seat. At the same time a restraining pressure is thrown against piston 18 in the hollow piston rod B in order to prevent the involuntary tendency to over apply the pressure by the receding action of the piston C. It is evident that should a further movement of the valve mechanism be made at this time, that additional pressure would be admitted, and automatically cut off, according to the extent of the movements of operation as outlined above. The release or decrease of pressure is secured or accomplished by merely raising the exhaust valve 21 out of its seat, whereupon the air of the entire system will escape through the said valves and out through the ports 12ᵃ in the cap 12 of the piston rod B. It will be seen that the reduction of pressure thus brought about in the chamber 3 will cause the piston C to be raised by the spring expansion beneath it, carrying the closed intake valve 14 with it, and keeping the exhaust valve seat 19 which is chamfered in the head of the tubular valve stem 15 in close proximity to the receding valve head 21, so that should the raising of said exhaust valve 21 cease, then the release of pressure would instantly cease, because of the seating of the valve 21 by the pressure of the main spring 5. It is also obvious that any leak of the applied air would be automatically replaced by the main spring 5 opening the intake valve 14, and allowing air to enter and replace the leakage, and by such replacement cause a movement of the piston C until the intake valve 14 would again be closed, the pressure on the operated valve assembly at the eye bolt 23 remaining constant. The graduation of pressure is determined by the extent of movement at the eye bolt 23 and the tension of the main spring 5.

Having thus described my invention, and its operation I desire to secure by Letters Patent, and claim:—

1. An automatic control valve comprising a casing; a piston slidably carried in said casing; exhaust and intake valves operable by the movements of the piston; means to manually operate said valves in one direction; means to convey air to said valves; a spring to regulate the movement of said piston; means to move said piston against said spring tension by the involved air pressure; means to utilize the movement of the piston to operate the said valves to automatically regulate the amount of air pressure allowed to pass the valves.

2. An air valve comprising a casing; a piston operable within said casing; a spring to regulate the movements of said piston; a hollow piston rod attached to said piston; valves operable within said piston rod; means to convey compressed air against the head of said piston; means to manually operate the valves to allow varying air pressures to pass them.

3. An air valve comprising a casing; a piston operable therein and dividing the interior of the casing into two compartments; a spring in one compartment to regulate the movement of said piston; a hollow piston rod attached at one end to said piston; a flexible connection between the casing and piston rod; coacting valve stems operable in said piston rod; a valve on each of said stems either of which is adapted to close when the other is open; and means to direct compressed air through said casing and hollow rod in either direction.

4. An air control mechanism comprising a casing; a piston operable therein and having a central valve seat opening; a spring to regulate the movement of said piston; a hollow piston rod having air ports in its wall and with one end attached to said piston; coacting valves operable in said piston rod either of which is adapted to open when the other is closed; and means to direct compresed air in either direction through said casing and piston rod.

5. An air control mechanism comprising a casing having a hole in its side wall; a piston operable in the casing; a spiral spring carried in the casing adapted to be compressed by said piston; a hollow piston rod secured to one face of said piston and having an air port in its wall; an interior casing secured on the other face of said piston and movable therewith; valve stems operable in said piston rod; a valve on each of said stems either of which is closed when the other is opened; a flexible connection between the interiors of the first mentioned casing and said piston rod; and means to direct compressed air through the first mentioned casing and said piston rod.

6. An automatic control valve comprising a casing; a piston operable therein having a central valve seat; a main spring to regulate the movement of said piston; a piston rod secured to said piston, and tubular in form with air ports in its wall; a flexible tube connecting a chamber within said casing with the interior of said piston rod; valve stems operable in the piston rod; intake and exhaust valve heads carried on the stems; a spring in said piston rod to hold the intake valve normally seated in said central valve seat; means to manually operate the said valves; and means to direct compressed air through the intake valve.

In testimony whereof I have affixed my signature.

ROBERT E. MITTON.